Patented June 29, 1943

2,322,990

UNITED STATES PATENT OFFICE 2,322,990

CONDENSATION PRODUCTS AND A PROCESS OF PREPARING THEM

Arthur Wolfram, Frankfort - on - the - Main-Roedelheim, and Hellmuth Jahn, Bad Soden in Taunus, Germany; vested in the Alien Property Custodian No Drawing. Application August 1, 1939, Serial No. 287,758. In Germany August 3, 1938

12 Claims. (Cl. 260—51)

The present invention relates to condensation products and to a process of preparing them.

In our co-pending U. S. A. application filed in the name of Arthur Wolfram and Hellmuth Jahn for "Condensation products and a process of preparing them," bearing Serial No. 287,757 and dated August 1, 1939, there are described new compounds obtained by condensation of an aliphatic polymer of acetylene, such as vinylacetylene, divinyl-acetylene, octatrienine or the like, with an aromatic hydroxy-compound in the presence of a strongly acid catalyst.

We have found that these new products can be condensed with formaldehyde. The condensation, which may be performed in water, in an alcohol (ethanol, butanol) or the like, and in an acid or alkaline medium, takes place in the manner usual for the preparation of phenol aldehyde resins. As alkalies there may be used sodium hydroxide, potassium hydroxide, sodium carbonate, potassium carbonate, ammonia. The reaction temperatures range from about 50° C. to about 100° C. The formaldehyde may be used in excess but it is also possible to react the equivalent quantity of formaldehyde with the phenols.

Compounds are thus obtained which in the cold are in most cases soluble in alkalies. On heating to temperatures which are usual for the hardening of phenol aldehyde resins this property is lost, and the compounds become insoluble, also in organic solvents. Owing to this behaviour, the products are suitable for use in the manufacture of plastics. Furthermore, the new products of condensation with formaldehyde have the property of being thermoplastic. The moulded masses obtained from these products are distinguished from the known phenol-aldehyde masses by a better strength. They are also superior to the known phenol-aldehyde masses in that they become soft only at 185° C.

The following examples serve to illustrate the invention but they are not intended to limit it thereto, the parts being by weight:

(1) 100 parts of the condensation product from phenol and divinyl-acetylene are dissolved, while heating, preferably in a closed vessel in ten times their weight of a caustic soda solution of 5 per cent strength and condensed, for 6 hours at about 60° C., with 150 parts of a formaldehyde solution of 30 per cent strength. The viscid solution thus obtained may be used, for instance, as a binding agent in the manufacture of artificial wood.

(2) 100 parts of the condensation product from phenol and divinyl-acetylene are dissolved in 400 parts of alcohol and 10 parts of a caustic soda solution of 40° Bé. 200 parts of a formaldehyde solution of 30 per cent strength are then added, drop by drop, and the mixture is kept in a closed vessel at 60° C. to 70° C. for 3 hours. The darkbrown syrupy solution is concentrated under reduced pressure. After evaporation of the solvent in the drying oven at 110° C. there remains an elastic, transparent film.

(3) 500 parts of the condensation product from phenol and divinyl-acetylene are dissolved in 1600 parts of butanol and 50 parts of a caustic soda solution of 40° Bé. 800 parts of a formaldehyde solution of 30 per cent strength are then slowly run in and the whole is heated in a closed vessel for 3 hours at 60° C. to 70° C. Under reduced pressure, the mass is thickened to form a viscous product which may be used as a resin for casting.

(4) 300 parts of the condensation product from technical cresol and divinyl-acetylene are dissolved in 680 parts of a caustic soda solution of about 12 per cent strength and the solution is then heated in a closed vessel for 3 hours at about 60° C. to 70° C., with 500 parts of a formaldehyde solution of 30 per cent strength. The mixture which has become solid by the following day is stirred in dilute hydrochloric acid and the solid matter is filtered with suction and washed until neutral. After drying under reduced pressure, a voluminous feebly yellowish powder is obtained which is suitable for moulding. The softening point of the product lies at about 185° C. and the strength of the product is even superior to that of the known resins from phenol and aldehyde containing no filling material.

(5) 100 parts of the condensation product from phenol and divinyl-acetylene are stirred with 400 parts of alcohol and 12 parts of concentrated hydrochloric acid until dissolution has occurred. 150 parts of a formaldehyde solution of 30 per cent strength are then caused to run in and the whole is heated in a closed vessel for 24 hours at about 60° C. After concentrating, under reduced pressure, the solution containing the hydrochloric acid, a dark product is obtained which, on drying above 100° C., likewise loses its solubility in alcohol and in alkalis.

(6) 100 parts of the condensation product from phenol and monovinyl-acetylene are dissolved in 300 parts of alcohol; 10 parts of a caustic soda solution of 40° Bé. are then added and the whole is heated in a closed vessel for 3 hours at 60° C., with 150 parts of a formaldehyde solution of 30 per cent strength. The product thus obtained has properties similar to those of the product described in Example 2.

We claim:

1. The process which comprises causing formaldehyde to act in the presence of condensation catalysts known to promote the formation of resinous condensation products from phenols and formaldehyde upon products obtained by the condensation of an hydroxy-benzene with aliphatic polymers of acetylene containing at least one double bond besides a triple bond in the presence of a strongly acid catalyst.

2. The process which comprises causing formaldehyde to act in an alkaline medium upon products obtained by the condensation of an hydroxy-benzene with aliphatic polymers of acetylene containing at least one double bond besides a triple bond in the presence of a strongly acid catalyst.

3. The process which comprises causing formaldehyde to act in an alkaline medium and at temperatures between about 50° C. and about 100° C. upon products obtained by the condensation of an hydroxy-benzene with aliphatic polymers of acetylene containing at least one double bond besides a triple bond in the presence of a strongly acid catalyst.

4. The process which comprises causing formaldehyde to act in an alkaline medium and at temperatures between about 50° C. and about 100° C. upon products obtained by the condensation of an hydroxy-benzene with divinylacetylene in the presence of a strongly acid catalyst.

5. The process which comprises causing formaldehyde to act in the presence of aqueous sodium hydroxide at a temperature of about 60° C. upon a product obtained by the condensation of phenol with divinylacetylene in the presence of a strongly acid catalyst.

6. The process which comprises causing formaldehyde to act in the presence of aqueous sodium hydroxide at a temperature of about 60° C. to 70° C. upon a product obtained by the condensation of technical cresol with divinylacetylene in the presence of a strongly acid catalyst.

7. The process which comprises causing formaldehyde to act in the presence of an aqueous-alcoholic solution of hydrogen chloride at a temperature of about 60° C. upon a product obtained by the condensation of phenol with divinylacetylene in the presence of a strongly acid catalyst.

8. The products obtained by the process of claim 1, said products being resins, insoluble in alkalies and organic solvents, when heated.

9. The products obtained by the process of claim 2, said products being resins, insoluble in alkalies and organic solvents, when heated.

10. The products obtained by the process of claim 5, said products being resins, insoluble in alkalies and organic solvents, when heated.

11. The products obtained by the process of claim 6, said products being resins, insoluble in alkalies and organic solvents, when heated.

12. The products obtained by the process of claim 7, said products being resins, insoluble in alkalies and organic solvents, when heated.

ARTHUR WOLFRAM.
HELLMUTH JAHN.